May 7, 1940.  C. R. SHANNON  2,200,044
FISH CARRIER
Filed April 15, 1939
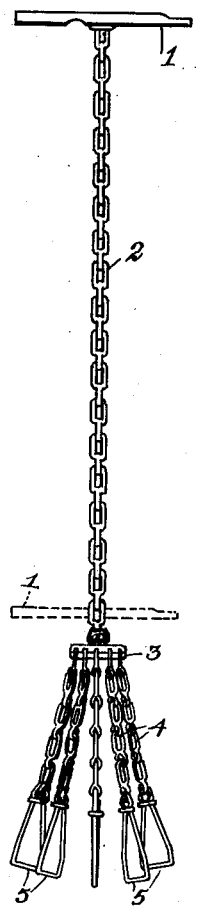
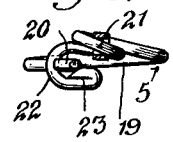
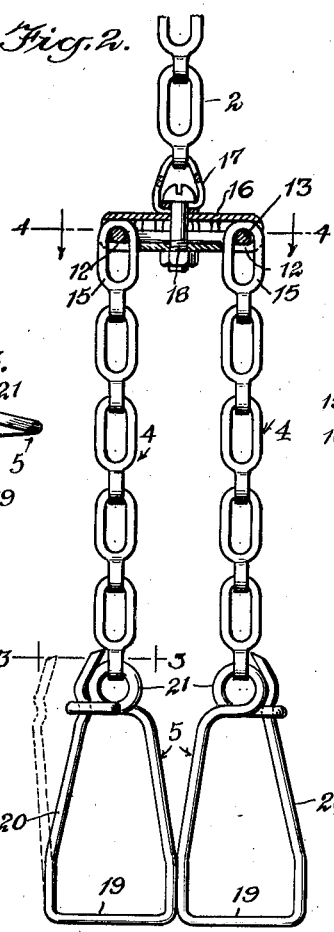
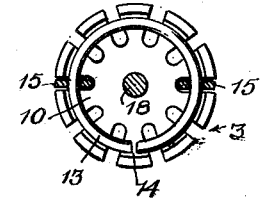
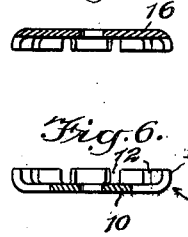
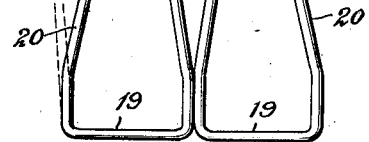
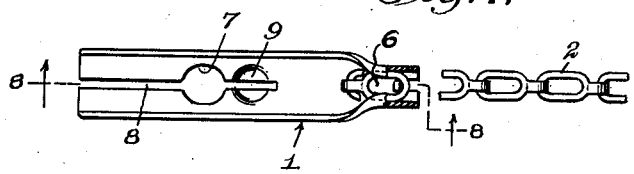
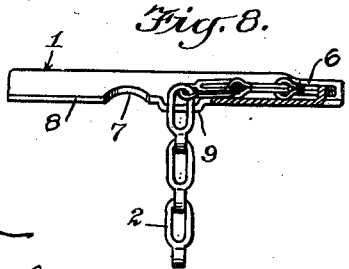
WITNESSES
INVENTOR
Charles R. Shannon
BY
ATTORNEYS Patented May 7, 1940

2,200,044

UNITED STATES PATENT OFFICE 2,200,044

FISH CARRIER

Charles R. Shannon, Harlan, Ky., assignor of one-fourth to L. R. Muir, Crummies, Ky., and one-fourth to Carl Abel, Lenarue, Ky.

Application April 15, 1939, Serial No. 268,070

2 Claims. (Cl. 224—7)

This invention relates to an improved fish carrier and has for an object to provide a construction wherein the fish may be readily placed on the carrier and removed therefrom, and when on the carrier may be submerged in water or carried from place to place.

Another object of the invention is to provide a carrier on which fish are adapted to be placed and left in the water until a desired time and then the parts adjusted for presenting a handle adjacent the bunch of fish so that the fish may be carried without any inconvenience.

A further object more specifically is to provide a carrier for fish provided with a plurality of fish-engaging members, a supporting chain, and a handle which may be adjusted to various points on the chain so that the handle may be arranged at a distance from the fish or very near the fish.

In the accompanying drawing—

Figure 1 is a side view of a carrier disclosing an embodiment of the invention;

Fig. 2 is an enlarged sectional view through the lower part of the structure shown in Fig. 1, a number of fish-engaging members being eliminated for the purpose of clearness;

Fig. 3 is a top plan view of one of the fish-engaging loops, the view being taken on the line 3—3 of Fig. 2;

Fig. 4 is a fragmentary sectional view through Fig. 2 approximately on the line 4—4;

Fig. 5 is a sectional view through the washer shown in Fig. 2, the same embodying certain features of the invention;

Fig. 6 is a sectional view similar to the upper part of Fig. 2 but showing a carrier plate coacting with the washer shown in Fig. 5;

Fig. 7 is a plan view of the handle shown in Fig. 1 together with a short section of chain;

Fig. 8 is a sectional view through Fig. 7 approximately on the line 8—8, the chain being shown interlocked with the handle in a similar manner to that shown in Fig. 1.

When fishing from a small boat it is customary to place the fish on a string or other member and then to allow the fish to remain in the water while the end of the string or other member is connected to some part of the boat. This keeps the fish fresh until it is time to land.

In the present invention means has been provided for receiving the fish and holding the same captive while the fisherman is in the boat. The structure also is adapted to be adjusted so that the fish may be carried in a small bunch rather than on a long string. As illustrated in Fig. 1, the numeral 1 indicates a handle and 2 a chain of any desired length. The chain 2 is connected with a carrier plate 3 which supports a number of auxiliary chains 4, and each of these auxiliary chains is provided with a fish-engaging loop 5. The handle 1, as shown in Figs. 7 and 8, is an arc-shaped (in section) piece of metal having an opening 6 for receiving one link of the chain 2 and also an opening 7 through which the chain may move when adjusting the position of the handle on the chain. The handle 1 is also provided with a slot 8 extending from one end of the handle to the opening 7 and beyond opening 7 across the depression 9. When it is desired to use the handle 1 at the end of the chain, the parts are arranged as shown in Fig. 8, with one of the links of the chain extending through slot 8 at the depression 9. In case it should be desired to move the handle 1 to a point near the carrier plate 3, or at any place along the chain 2, the link in the slot 8, as shown in Fig. 8, is moved over to the opening 7 and then the handle slid along the chain to the desired point. After this has been done the parts are adjusted so that one of the lower links will fit into the slot 8 adjacent the depression 9. By this arrangement the entire chain 2 may be used when the fish are in the water, but when it is desired to carry the fish the handle 1 is moved to a point adjacent the carrier plate 3 so that the handle will be near the head of the fish.

The carrier plate 3 is provided with a base 10, an upstanding flange 11, and a number of slits 12. In the accompanying drawing ten slits have been shown but it will be evident that more or less may be provided without departing from the spirit of the invention. Arranged in the carrier plate 3 is a ring 13 divided at 14 whereby the end link 15 of each of the chains 4 may be applied to the ring or removed therefrom. After the links 15 have been applied to the ring 13, the parts are then arranged as shown in Fig. 4. The clamping washer 16 is then placed in position, as illustrated in Fig. 2, and the link or toggle 17 is also arranged as shown in said figure. After the parts have been assembled as just described the bolt 18 is applied and then the parts are in condition for functioning properly.

The chain 2 may be a foot or several feet long if desired, but preferably the chains 4 are approximately three inches long so that the heads of the fish will be near the carrier plate 3. At the lower end of each of the chains 4 there is provided a fish-engaging loop 5 which is preferably made of resilient wire and provided with a body portion 19 which at one end merges into a resilient member 20 which is adapted to be inserted through the upper and lower lips of the fish when the fish is being threaded onto the loop 5. The upper end of body 19 is formed with a loop presenting an eye 21 which merges into a hook 22 having a bent-back end portion 23 that presents a rounded or smooth portion and an abutment for preventing the member or arm 20 from moving out of the hook 22.

It will be noted that as the loops are all of the same size and shape and the chain 4 of the same length, all of the fish on the carrier will be arranged in a group or circle. If the entire carrier, as shown in Fig. 4, is filled there will be ten fish when the structure shown in the drawing is used. These ten fish will be arranged in a circle and when the handle 1 is moved down to near the carrier plate 3 the group or bunch of fish may be readily carried, which would not be the case if the fish were arranged one after the other on a string. Also any individual fish may be quickly removed, which would not be possible where an ordinary string or cord is used.

After a fish is caught it is placed on one of the loops 5 and then placed in the water. When a second fish is caught the second fish is likewise placed on a loop 5 and placed in the water. It will be understood that the chain 2, preferably near the handle 1, is secured in some manner to the boat so that the fish which have been caught and held by the carrier will be ready to be removed from the water when the fishing operation is completed. In this way the fish are maintained fresh and usually alive until the entire bunch is removed when the fisherman goes ashore.

I claim:

1. A fish carrier including a handle, a chain having one end connected with said handle, a carrier plate having a plurality of slots in the periphery, a ring arranged in said carrier plate, a chain for each of said slots, said chains having flat links, one link of each chain extending through a slot and surrounding said ring, a washer arranged on the top of said ring for preventing the same leaving said carrier plate and a bolt connected with one end of the first-mentioned chain and extending through said washer and said carrier plate for clamping the washer and carrier plate together and at the same time connecting the first-mentioned chain with the carrier plate, and a plurality of fish-receiving loops arranged at the free ends of the auxiliary chains.

2. A fish carrier including a handle, a chain having one end connected with said handle, a carrier plate, a ring arranged in said carrier plate, a washer arranged on the top of said ring for preventing the ring leaving the carrier plate, a fastener member connected with one end of said chain and extending through said washer and said carrier plate for clamping the washer and the carrier plate together and at the same time connecting said chain with the carrier plate, and a plurality of fish-receiving loops connected with said ring.

CHARLES R. SHANNON.